US008872497B2

(12) United States Patent
Nakashima (10) Patent No.: US 8,872,497 B2
(45) Date of Patent: Oct. 28, 2014

(54) SWITCHED-MODE POWER SUPPLY (75) Inventor: Heisuke Nakashima, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 232 days.

(21) Appl. No.: 13/457,997

(22) Filed: Apr. 27, 2012

(65) Prior Publication Data
US 2012/0274300 A1 Nov. 1, 2012

(30) Foreign Application Priority Data

Apr. 28, 2011 (JP) ................................. 2011-100913

(51) Int. Cl.
G05F 1/00 (2006.01)
H02M 3/156 (2006.01)
H02M 1/14 (2006.01)

(52) U.S. Cl.
CPC ................ H02M 1/14 (2013.01); H02M 3/156 (2013.01)
USPC ......................................... 323/288; 323/285

(58) Field of Classification Search
USPC ......................................... 323/282–285, 288
See application file for complete search history.

(56) References Cited

U.S. PATENT DOCUMENTS

| 7,782,024 B2 * | 8/2010 | Fukushi et al. | 323/224 |
| 8,373,395 B2 * | 2/2013 | Yashiki | 323/222 |
| 8,441,239 B2 * | 5/2013 | Miyamae | 323/271 |
| 8,570,019 B2 * | 10/2013 | Nakamura | 323/284 |
| 8,604,769 B2 * | 12/2013 | Murakami | 323/284 |

FOREIGN PATENT DOCUMENTS

| JP | 4610588 B2 | 3/2008 |
| JP | 4613986 B2 | 2/2010 |

* cited by examiner

Primary Examiner — Gary L Laxton
Assistant Examiner — Afework Demisse
(74) Attorney, Agent, or Firm — Holtz, Holtz, Goodman & Chick PC

(57) ABSTRACT

Disclosed is a switched-mode power supply including an inductor which is connected between a voltage input terminal to which a DC voltage is input and an output terminal to which a load is connected, a driver switching element which intermittently feeds a current to the inductor and a control circuit which generates a control pulse according to a feedback voltage from output side and controls on/off of the driver switching element. The control circuit includes a voltage comparison circuit which compares the feedback voltage to a predetermined voltage and a pseudo ripple generator circuit which generates a pseudo ripple voltage having a predetermined amplitude, and the control circuit injects a ripple component in a transmission path of the feedback voltage based on the pseudo ripple voltage generated by the pseudo ripple generator circuit.

3 Claims, 8 Drawing Sheets

Vripple

Vripple

Vripple

SWITCHED-MODE POWER SUPPLY

CROSS-REFERENCE TO RELATED APPLICATIONS

This application is based upon and claims the benefit of priority under 35 USC 119 of Japanese Patent Application NO. 2011-100913 filed on Apr. 28, 2011, the entire disclosure of which, including the description, claims, drawings, and abstracts, is incorporated herein by reference in its entirety.

BACKGROUND OF THE INVENTION

1. Field of the Invention

The present invention relates to a DC-DC converter which transforms DC voltage based on the switching regulator system, and in particular to a switched-mode power supply having a ripple injection function.

2. Description of Related Art

DC-DC converter based on the switching regulator system has been known as a circuit which transforms DC input voltage into a DC voltage of different level. This sort of DC-DC converter includes a driver switching element, a rectifier element and a control circuit. The driver switching element applies DC voltage, received from a DC power supply such as a battery, to an inductor (coil) to thereby feed current thereto and accumulate the energy therein. The rectifier element controls current which flows through the coil, in the time period when energy is discharged while the driver switching element is turned off. The control circuit performs on-off control of the driver switching element.

Conventionally known control methods for the DC-DC converter based on the switching regulator system include voltage control system, current control system and ripple control system. The voltage control system modulates pulse width or frequency of drive pulse for the switching element based on feedback of the output voltage. The current control system is an improved version of the voltage control system. The voltage control system and the current control system, however, suffer from slow response to abrupt changes in load.

On the other hand, the ripple control system performs on-off control of the switching element, upon detecting that the output voltage being monitored falls below (or exceeds) a preliminarily-set threshold value. The ripple control system is intrinsically free from delay ascribable to frequency characteristics of an error amplifier, and may therefore achieve faster response to load as compared to the voltage control system and the current control system.

The DC-DC converter based on the ripple control system generally makes use of a triangular wave (ripples) which appears in the output voltage ascribable to ESR (equivalent series resistance), a resistance component owned by a smoothing capacitor connected to an output terminal. The output voltage is kept constant by monitoring the output voltage using a comparator, and by repetitively turning the switching element on for a predetermined period of time every time the output voltage is detected as being below a predetermined value.

Conventionally, electrolytic capacitors, having a relatively large ESR, have been used as the capacitor for smoothing the output voltage. The ripple control has, therefore, never been interrupted due to shortage of the ripples. However, recent growing need in the market of digital home electric appliances is directed to ceramic capacitors having smaller ESR, aiming at reducing the ripples per se, the external dimensions, and the cost and at improving the reliability. Capacitors having small ESR, however, scarcely produce the ripple component, and disable the ripple control. One known proposal is directed to a switched-mode power supply configured to inject the ripple component into feedback voltage of the output voltage (see Japanese Examined Patent No. 4610588).

Further, an invention relating to a switched-mode power supply including an integrating circuit which generates ripple voltage similar to ripple current that feeds into an inductor, the integrating circuit being connected in parallel with the inductor is suggested (see Japanese Examined Patent No. 4613986). In this invention, the generated ripple voltage is transformed into current to be supplied, as a working current, to a comparator which compares the feedback voltage and the reference voltage and to be supplied, as an input voltage, to the comparator.

SUMMARY OF THE INVENTION

However, generally in a switched-mode power supply, output voltage and feedback voltage thereof are monitored to protect the power supply from overvoltage and short circuit in many cases. Therefore, when a ripple component is to be injected into the feedback voltage of the output as in the ripple injection circuit of Japanese Examined Patent No. 4610588, there is a possibility that malfunction occurs in the protection circuit.

Further, in the ripple injection circuit of Japanese Examined Patent No. 4613986 in which ripple voltage is generated by integrating the voltage of the node to which the inductor is connected, duty ratio of the voltage of the node to which the inductor is connected varies causing the amplitude of the ripple voltage to be generated to vary according to the duty ratio. Therefore, there is a possibility that line regulation (rate of output voltage fluctuation with respect to input voltage fluctuation) degrades.

In view of the above problems, the object of the present invention is to provide a technique to install a ripple injection function in a control circuit (IC) in a switched-mode power supply based on the ripple control system without degrading line regulation and causing malfunction in the protection circuit.

In order to achieve the above object, according to a first aspect of the present invention, there is provided a switched-mode power supply of the present invention includes an inductor which is connected between a voltage input terminal to which a DC voltage is input and an output terminal to which a load is connected, a driver switching element which intermittently feeds a current to the inductor and a control circuit which generates a control pulse according to a feedback voltage from output side and controls on/off of the driver switching element, and the switched-mode power supply outputs a voltage having a level different from an input voltage, the control circuit includes a voltage comparison circuit which compares the feedback voltage to a predetermined voltage and a pseudo ripple generator circuit which generates a pseudo ripple voltage having a predetermined amplitude, and the control circuit injects a ripple component in a transmission path of the feedback voltage based on the pseudo ripple voltage generated by the pseudo ripple generator circuit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Preferred embodiments of the present invention will be explained below with reference to the attached drawings.

Figure 1:
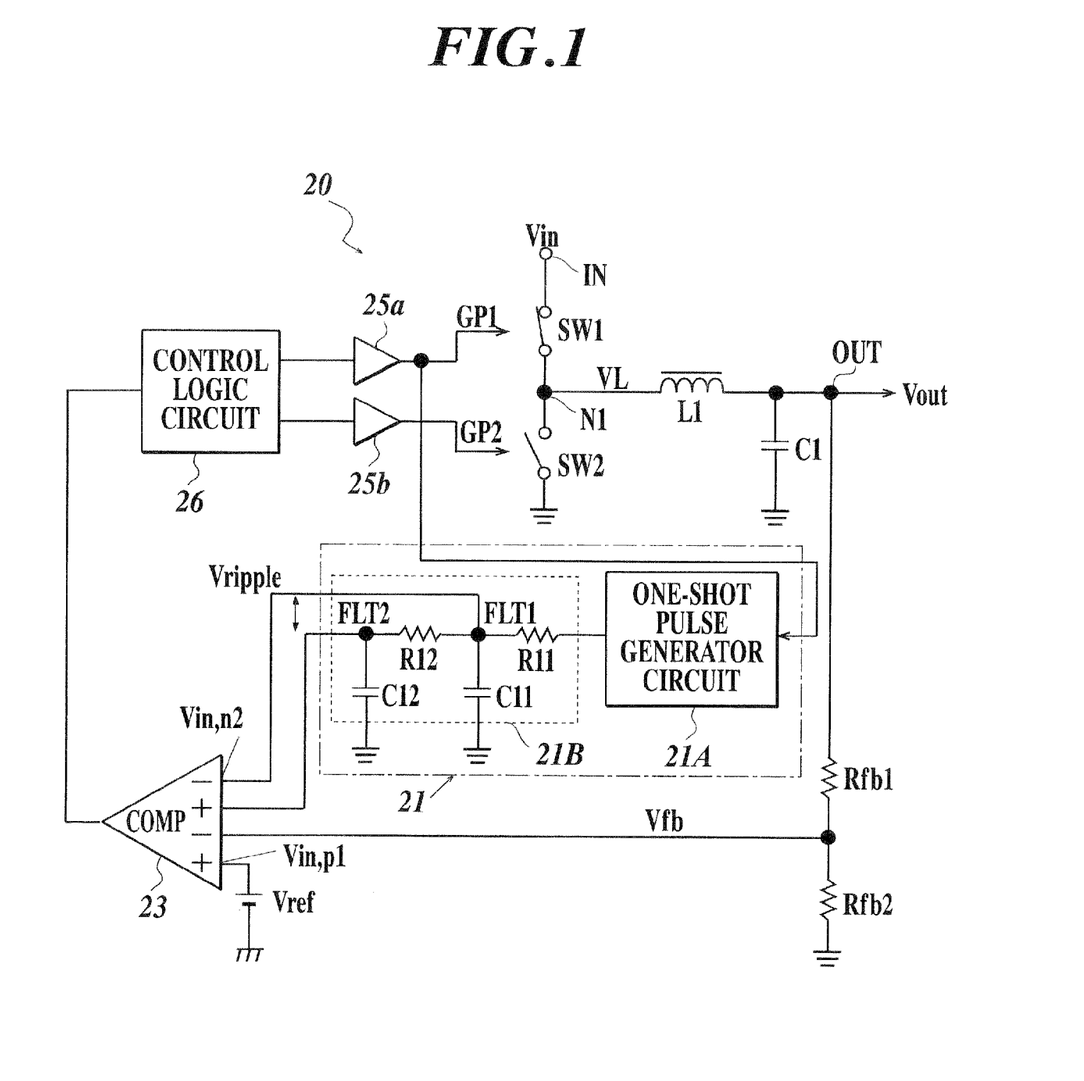
FIG. 1 is a circuit configuration chart illustrating one embodiment of a DC-DC converter based on switching regulator system according to the present invention.

FIG. 1 illustrates an embodiment of a DC-DC converter based on the switching regulator system according to the present invention.

The DC-DC converter of this embodiment includes a coil L1 as an inductor, a high-side driver switching element SW1 and a low-side rectifier switching element SW2. The high-side driver switching element SW1 is connected between a voltage input terminal IN, through which DC input voltage Vin is applied, and one terminal of the coil L1, and feeds drive current to the coil L1. The low-side rectifier switching element SW2 is connected between one terminal of the coil L1 and a grounding point. Each of the driver switching element SW1 and rectifier switching element SW2 may typically be configured by a MOSFET (insulated gate field effect transistor).

The DC-DC converter of this embodiment includes a switching control circuit 20 and a smoothing capacitor C1. The switching control circuit 20 performs on-off switching of the driver switching element SW1 and the rectifier switching element SW2. The smoothing capacitor C1 is connected between the other terminal (output terminal OUT) of the coil L1 and a grounding point.

While not specifically limited, among the circuits and elements configuring the DC-DC converter, the switching control circuit 20 may be formed on a semiconductor chip to form a semiconductor integrated circuit (power supply control IC) and the coil L1 and the capacitor C1 may be connected to an external terminal of the power supply control IC as an externally-attached element. The driver switching element SW1 and the rectifier switching element SW2 herein may be externally-attached elements, or may be on-chip elements provided inside the switching control circuit 20. This embodiment is effective typically for the case where a ceramic capacitor, having a small ESR, is used as the capacitor C1.

In the DC-DC converter of this embodiment, the switching control circuit 20 generates drive pulses GP1 and GP2 used for complementarily turning the driver switching element SW1 and the rectifier switching element SW2 on or off. The switching control circuit 20 includes the pseudo ripple generator circuit 21 which generates a predetermined pseudo ripple voltage Vripple upon receiving the drive pulse GP1 regardless of the duty ratio of the drive pulse GP1.

In the first embodiment, the pseudo ripple generator circuit 21 includes a one-shot pulse generator circuit 21A and a filter circuit 21B. The one-shot pulse generator circuit 21A generates a fixed pulse having a predetermined pulse width upon receiving the drive pulse GP1. The filter circuit 21B consists of resistors and capacitors for integrating the fixed pulse generated by the one-shot pulse generator circuit 21A. The one-shot pulse generator circuit 21A includes a delay circuit which delays the input signal for a predetermined pulse width and an exclusive OR gate or RS flip-flop which receives the signal which is delayed in the delay circuit and the input signal, for example. Here, the filter circuit 21B can be called otherwise as an integrating circuit which integrates the input pulse.

The switching control circuit 20 of this embodiment includes a comparator 23, a control logic circuit 26 and driver circuits 25a, 25b. The comparator 23 receives feedback voltage Vfb, resulted from voltage division of the output voltage Vout divided by series resistors Rfb1 and Rfb2, and a predetermined reference voltage Vref. The control logic circuit 26 includes a control pulse generator circuit which generates control pulses for turning the driver switching elements SW1 and the rectifier switching element SW2 on or off based on the output from the comparator 23. The driver circuits 25a, 25b generates and outputs the drive pulses GP1 and GP2 used for turning the driver switching element SW1 and the rectifier switching element SW2 on or off upon receiving the output from the control logic 26.

In this embodiment, the comparator 23 is configured by including a comparator with four inputs having two differential input stages, and the pseudo ripple voltage Vripple (which is the difference between the voltage passed through the low pass filter FLT 1 and the voltage passed through the low pass filters FLT1 and FLT2) generated by the pseudo ripple generator circuit 21 is input into the comparator 23. The control logic circuit 26 may be configured by a general adaptive on timer used in the converter based on the ripple control system, a fixed on period timer, a minimum off period timer, a flipflop and the like. The control logic circuit 26 can generate the drive pulses GP1 and GP2 which are used to turn the driver switching element SW1 and the rectifier switching element SW2 on or off in a complementary manner according to the output from the comparator 23.

In the DC-DC converter of this embodiment, the drive pulses GP1 and GP2 are generated based on the control pulses generated by the control logic circuit 26 and the driver switching element SW1 and the rectifier switching element SW2 are turned on or off in a complementary manner by the drive pulses. In a steady state, when the driver switching element SW1 is turned on, DC input voltage Vin is applied into the coil L1 to feed a current that flows toward the output terminal OUT to fill the smoothing capacitor C1.

When the driver switching element SW1 is turned off, the rectifier switching elements SW2 is turned on instead and the current flows into the coil L1 through the rectifier switching element SW2 which is turned on. By controlling the pulse width (duty) or the frequency of the drive pulse GP1 which is input into the control terminal (gate terminal) of the driver switching element SW1 according to the pseudo ripple voltage generated by the pseudo ripple generator circuit 21, the DC input voltage Vin is stepped down to generate the DC output voltage Vout having a predetermined voltage.

Next, the pseudo ripple generator circuit 21 of this embodiment will be described in detail.

The filter circuit 21B which constitutes the pseudo ripple generator circuit 21 of the first embodiment has a configuration as shown in FIG. 1 where the low pass filter FLT2 including the resistor R12 and the capacitor C12 is connected to the low pass filter FLT1 including the resistor R12 and the capacitor C12 as a stage that comes thereafter. The signal which passed through the low pass filters FLT1 and FLT2 is input into the comparator 23 as a differential input signal.

The input into the one-shot pulse generator circuit 21A is not limited to the drive pulse GP1, and the input may be the voltage VL of the node N1 to which the inductor L1 is connected or may be an input signal of the drivers 25a, 25b or an input signal of the control logic circuit 26 which is connected before the drivers 25a, 25b.

Figure 8A:
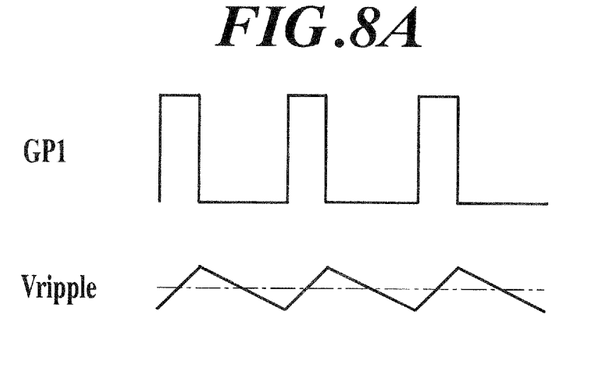
FIGS. 8A to 8C are timing charts showing changes in ripple component to be injected when duty ratio of drive pulse changes in a conventional switched-mode power supply provided with a ripple injection circuit.
Figure 8B:
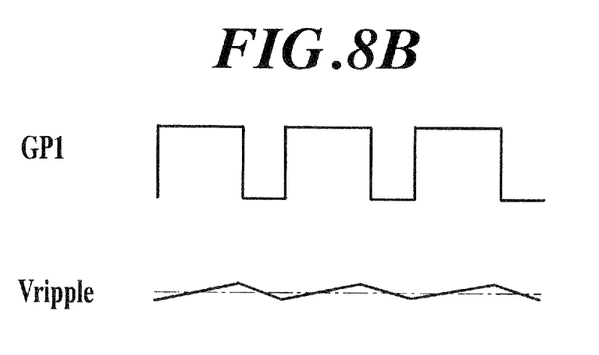
Figure 8C:
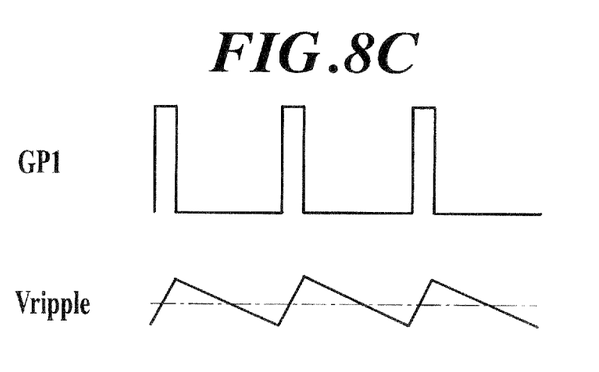

In the system where the ripple voltage is generated by integrating the voltage of the node to which the inductor is connected as in the ripple injection circuit of Japanese Examined Patent No. 4613986, the duty ratio of the voltage of the node to which the inductor is connected changes when the input voltage changes. Therefore, as shown in FIGS. 8A to 8C, amplitude of the ripple voltage Vripple to be generated changes according to the duty ratio of the drive pulse GP1.

Figure 2A:
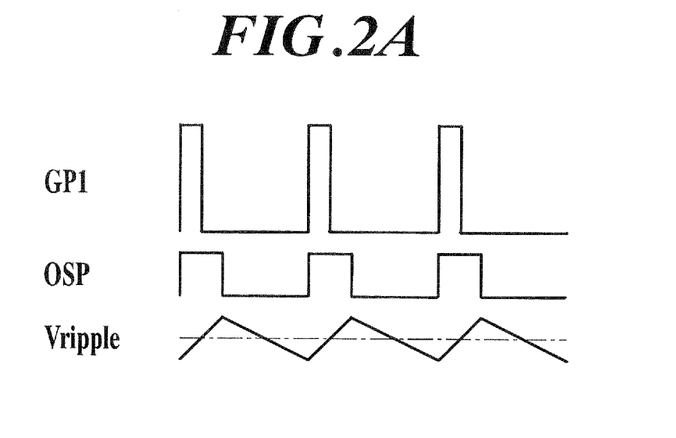
FIGS. 2A to 2C are timing charts showing changes in voltage at various points in a pseudo ripple generator circuit of the embodiment shown in FIG. 1.
Figure 2B:
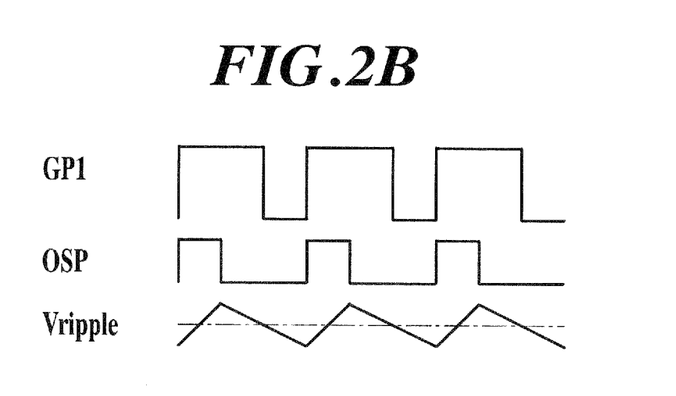
Figure 2C:
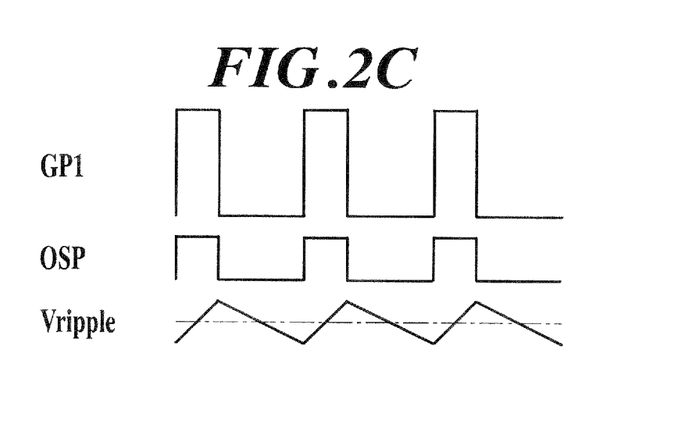

In contrary, when the pseudo ripple generator circuit 21 is configured by including the one-shot pulse generator circuit 21A and the filter circuit 21B which integrates the output pulse OSP of the one-shot pulse generator circuit 21A as in this embodiment, amplitude of the pseudo ripple voltage Vripple to be generated is to be approximately the same regardless of the duty ratio as shown in FIGS. 2A to 2C even when the duty ratio of the drive pulse GP1 changes. Therefore, line regulation can be prevented from being degraded.

Figure 3:
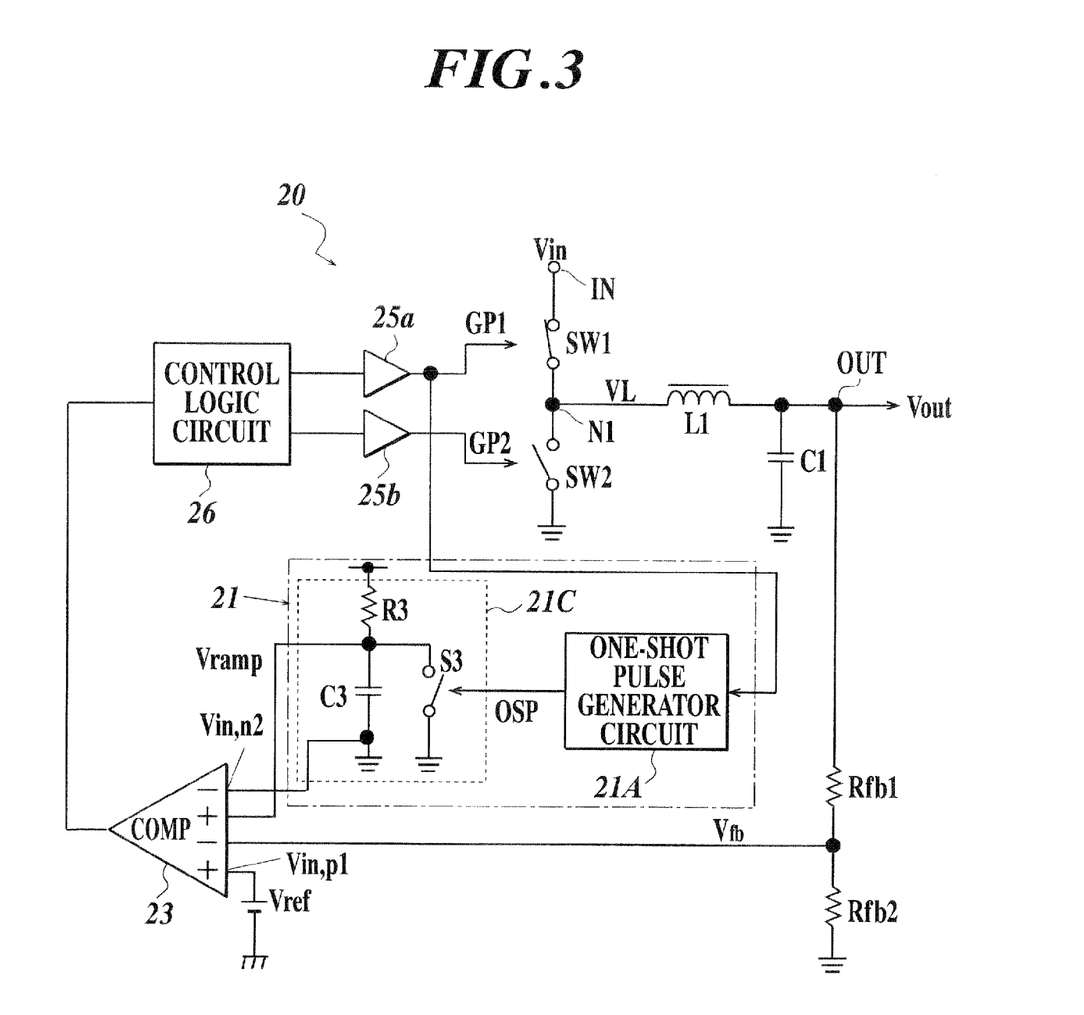
FIG. 3 is a circuit diagram illustrating the second embodiment of the pseudo ripple generator circuit.

FIG. 3 illustrates the second embodiment of the pseudo ripple generator circuit 21. The pseudo ripple generator circuit 21 of the second embodiment is configured by including the one-shot pulse generator circuit 21A and a wave form generator circuit 21C which generates a voltage Vramp of a ramp wave form (sawtooth wave) by the output pulse OSP of the one-shot pulse generator circuit 21a.

The wave from generator circuit 21C is configured by including a capacitor C3 which is connected in series with the resistor R3 and a discharger switch S3, for example. The discharger switch S3 is connected in parallel with the capacitor C3 and is turned on or off by the output pulse OSP of the one-shot pulse generator circuit 21A. In this circuit, the capacitor C3 is to be charged through the resistor R3 during the time period when the switch S3 is turned off, and the electric charge in the capacitor C3 is to be discharged when the switch S3 is turned on by the output pulse of the one-shot pulse generator circuit 21A. By repeating this operation, the wave form voltage (triangle wave in a broad sense) Vramp of sawtooth wave form is generated. The resistor R3 can be connected to a constant current source. The resistor R3 can be replaced by a constant current source.

Figure 4A:
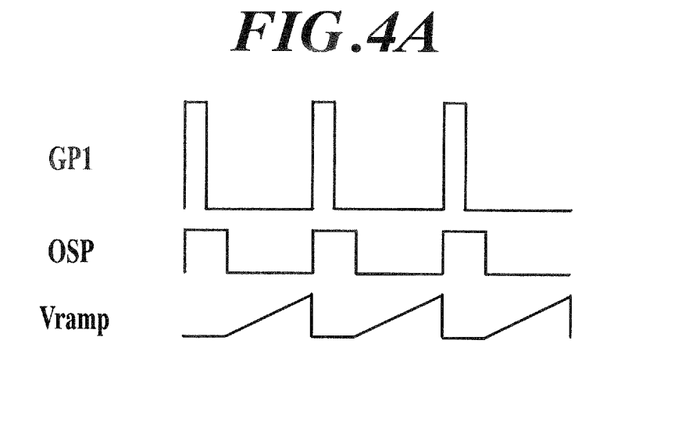
FIGS. 4A to 4C are timing charts showing changes in voltage at various points in the pseudo ripple generator circuit of the second embodiment.
Figure 4B:
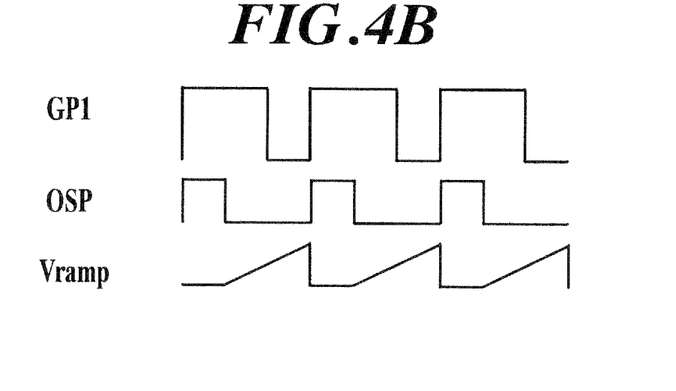
Figure 4C:
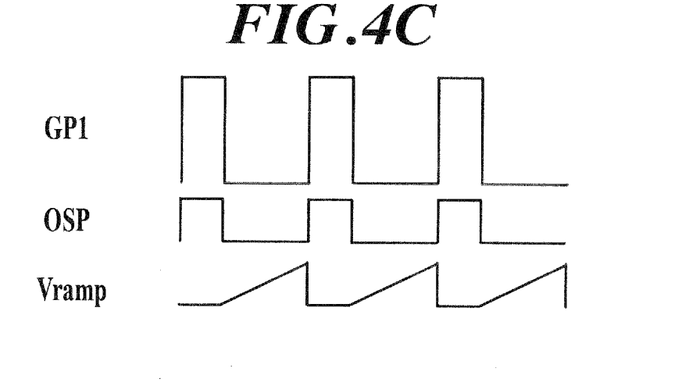

In the pseudo ripple generator circuit 21 of the second embodiment, as shown in FIGS. 4A to 4C, cycle of the one-shot pulse OSP to be output from the one-shot pulse generator circuit 21A matches the switching cycle (cycle of the drive pulse GP1) and the voltage Vramp to be output from the wave form generator circuit 21C forms a ramp wave form (sawtooth wave) that gradually increases only during the period when the one-shot pulse OSP is at low level. Therefore, even when the duty ratio of the drive pulse GP1 changes, the amplitude of the ramp wave form voltage Vramp which is generated as the pseudo ripple voltage is to be constant regardless of the duty ratio because the pulse width of the OSP is the same. Thereby, line regulation can be prevented from being degraded.

Moreover, in the case of the first embodiment shown in FIG. 1, although the line regulation is improved, there is a problem in the responsiveness at the time of load fluctuation. That is, in the DC-DC converter based on the ripple control system, it is controlled so that the on time of the switching element is to be fixed when the input voltage does not change and the output voltage Vout is to be constant according to the switching frequency. When the load changes, the switching frequency changes causing the duty ratio of the drive pulse to change. However, the load-transient response of the pseudo ripple voltage Vripple to be supplied to the comparator 23, the pseudo ripple voltage Vripple being generated in the filter circuit 21B shown in FIG. 1, is to be degraded because voltage delay occurs between the first stage and the second stage of the filter.

The ripple component is needed in the converter based on the ripple control system in order to detect the timing to turn on the driver switching element SW1 for feeding current into the coil L1. The wave form of the pseudo ripple voltage Vripple is not required to be in a form of triangle wave in a narrow sense. Therefore, in the case where the wave form generator circuit 21C which generates a ramp wave form (sawtooth wave) Vramp as in the pseudo ripple generator circuit 21 of the second embodiment shown in FIG. 3 is used, the problem of voltage delay does not occur. Thus, the load-transient responsiveness can be prevented from being degraded.

Figure 5:
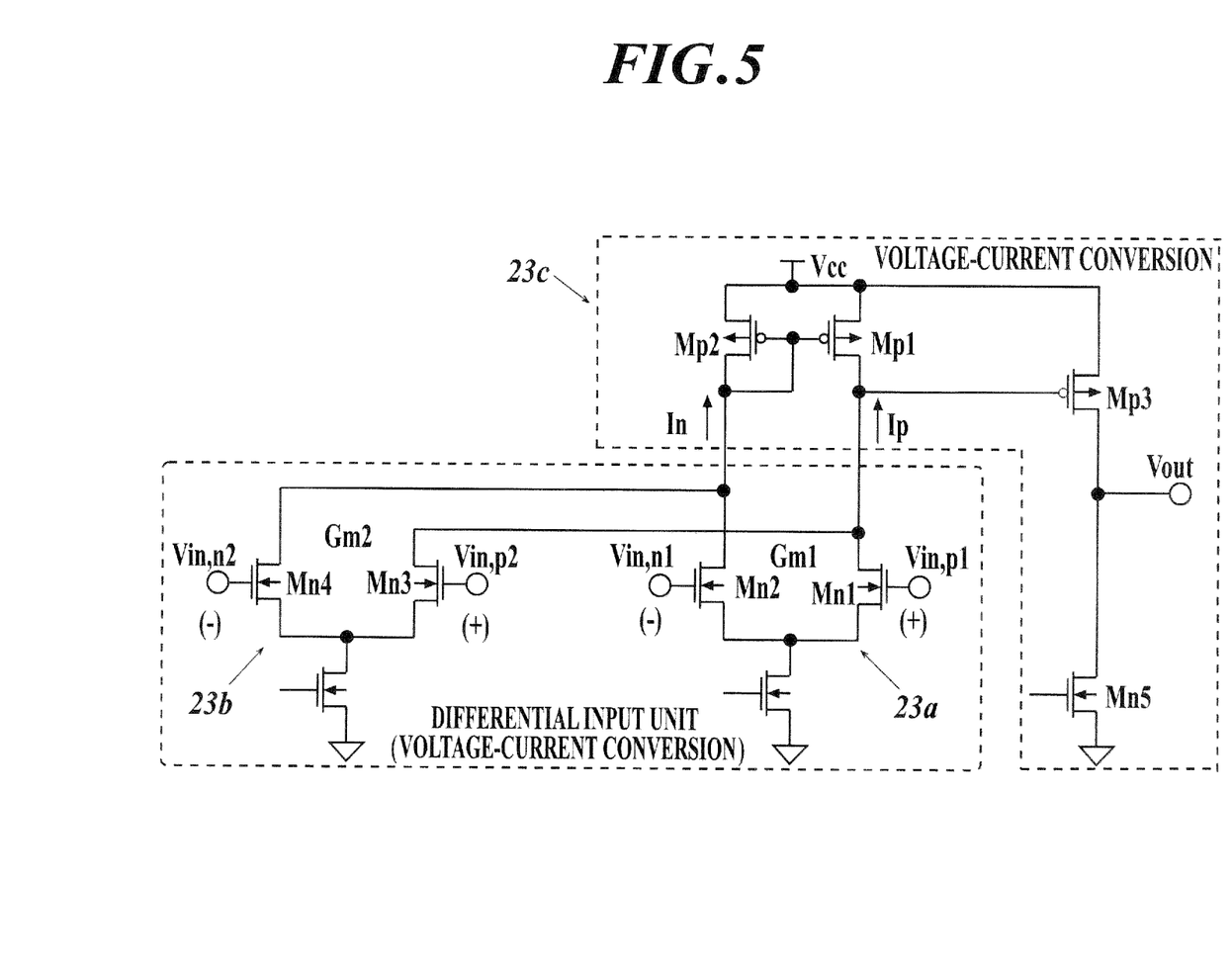
FIG. 5 is a circuit diagram illustrating a specific example of a comparator in the DC-DC converter of the embodiment shown in FIG. 1.

FIG. 5 shows a specific circuit example of the comparator 23 having four inputs which constitutes the switching control circuit 20 of the above embodiment.

The comparator 23 of this embodiment includes a first differential input stage 23a, a second differential input stage 23b and a current-voltage conversion unit 23c. The first differential input stage 23a includes MOS transistors Mn1 and Mn2 which are commonly connected to sources. The second differential input stage 23b includes MOS transistors Mn3 and Mn4 which are commonly connected to sources. The current-voltage conversion unit 23c includes active load transistors Mp1 and Mp2 which are common to the first and the second differential input stages and an output stage which is formed of transistors Mp3 and Mn5 which are connected in series and on and off thereof is controlled by the voltage to which current-voltage conversion is performed by the Mp1. Further, the reference voltage Vref and the feedback voltage Vfb from the output side are respectively input into the gate terminals of the MOS transistors Mn1 and Mn2 of the first differential input stage 23a.

The signals for differential which passed respectively through the low pass filters FLT1 and the low pass filters FLT1 and FLT2 of the first stage and the second stage of the filter circuit 21B, the filter circuit 21B constituting the pseudo ripple generator circuit 21, are input respectively into the gate terminals of the MOS transistors Mn3 and Mn4 of the second differential input stage 23b. Alternatively, the ramp wave form voltage Vramp which is generated in the wave form generator circuit 21C and the grounding voltage are input respectively into the gate terminals of the MOS transistors Mn3 and Mn4 of the second differential input stage 23b.

Here, the reason why a result similar to the result of applying a ripple component to the feedback voltage Vfb from the output side can be obtained in the comparator 23 of this embodiment will be described by using equations.

First, the part including the differential input stages 23a and 23b in the comparator of FIG. 5 is assumed as the voltage-current conversion circuit, and the part from the loads (Mp1, Mp2) that receive the converted differential current to the output is considered as the current-voltage conversion circuit.

Then, when the differential current ΔI=Ip−In to be input is positive, the output is to be at high level in the current-voltage conversion circuit, and when the differential current ΔI=Ip−In to be input is negative, the output is to be at low level. On the other hand, when the gain of the first differential input stage 23a is Gm1 and the gain of the second differential input stage 23b is Gm2, the output current ΔI can be expressed as the following equation (1) in the voltage-current conversion circuit of the differential input unit.

$$\Delta I = G_{m1}(V_{in,p1} - V_{in,n1}) + G_{m2}(V_{in,p2} - V_{in,n2}) \quad (1)$$

$$= G_{m1}\left\{V_{in,p1} - \left(V_{in,n1} + \frac{G_{m2}}{G_{m1}}(V_{in,n2} - V_{in,p2})\right)\right\}$$

In the above equation (1), the reference voltage Vref is plugged in for Vin, p1, the feedback voltage Vfb of output is plugged in for Vin, n1, and the pseudo ripple voltage Vripple of differential is plugged in for Vin, n2-Vin, p2. Then, level of the output current ΔI of the voltage-current conversion unit can be expressed by the following equation (2).

$$\Delta I = G_{m1}\left\{V_{ref} - \left(V_{fb} + \frac{G_{m2}}{G_{m1}}V_{ripple}\right)\right\} \quad (2)$$

Here, the output voltage Vout of the comparator 23 switches between high/low (the comparator reacts) when the output current ΔI of the differential input unit switches between positive and negative, that is, level of the output voltage Vout is determined according to whether the result of the equation (2) is positive or negative. From the equation (2), it can be understood that performing the calculation of the equation (2) is equivalent to comparing the voltage which is obtained by adding the pseudo ripple voltage Vripple, which is multiplied by (Gm2/Gm1), to the feedback voltage Vfb to the reference voltage Vref.

Moreover, from the equation (2), it can be understood that the same result can be obtained even when the pseudo ripple voltage Vripple is set to a large value by setting the quorum of the elements that constitute the comparator 23 so that the value of (Gm2/Gm1) in the equation will be 1 or smaller. Further, there is an advantage that the S/N ratio can be improved because the noise amount with respect to the pseudo ripple voltage Vripple decreases relatively if the pseudo ripple voltage Vripple can be large.

Figure 6:
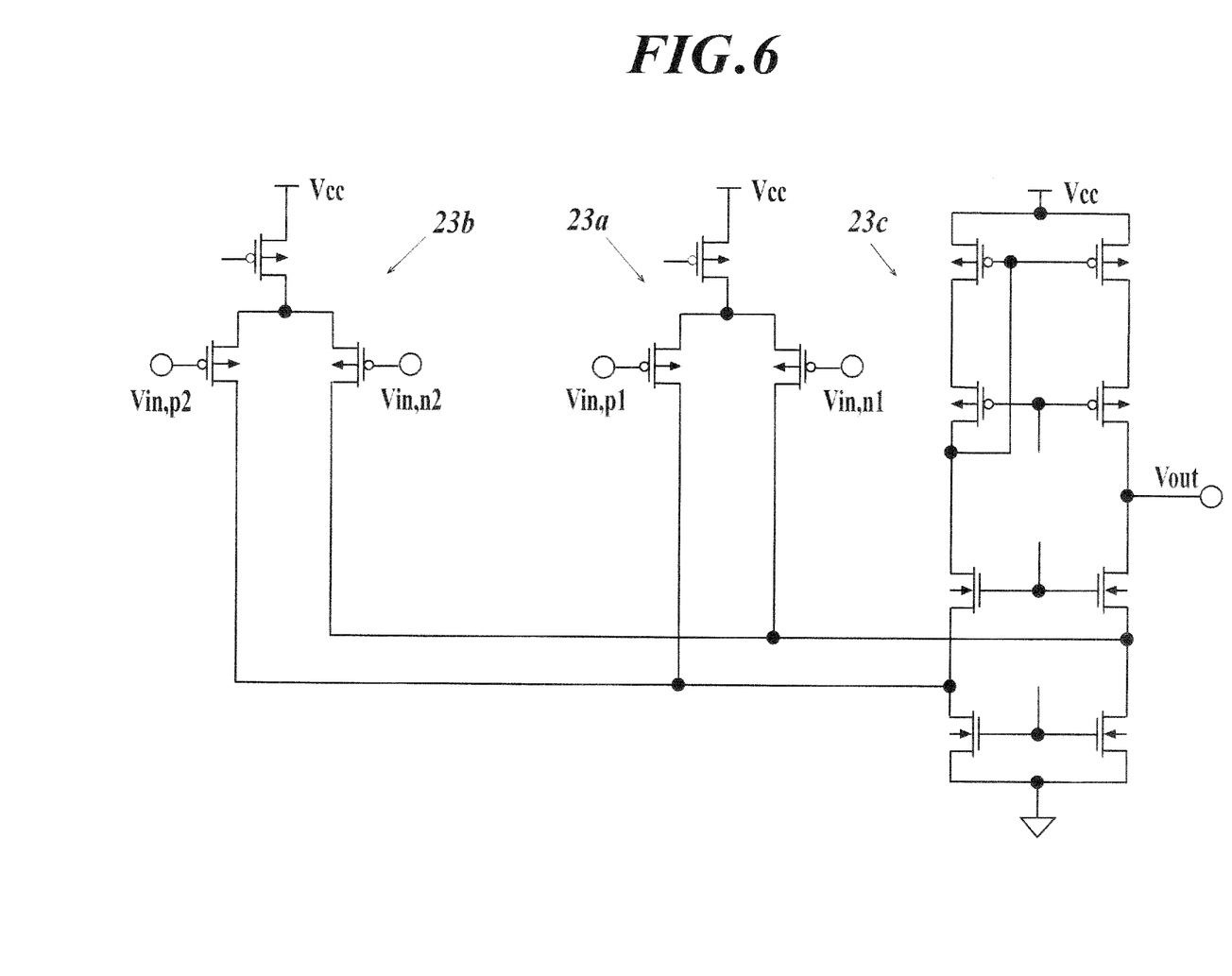
FIG. 6 is a circuit diagram illustrating a specific example of another comparator.

Here, the configuration of the current-voltage conversion circuit is not limited to the embodiment. The current-voltage conversion circuit can be configured with a folded cascade stage as shown in FIG. 6, for example. Further, the differential input stages do not need to be the n-type MOS transistors and can be p-type MOS transistors.

Next, more specific application example of the switching control circuit 20 which uses the ripple injection circuit 21 of the embodiment will be described by using FIG. 7.

Figure 7:
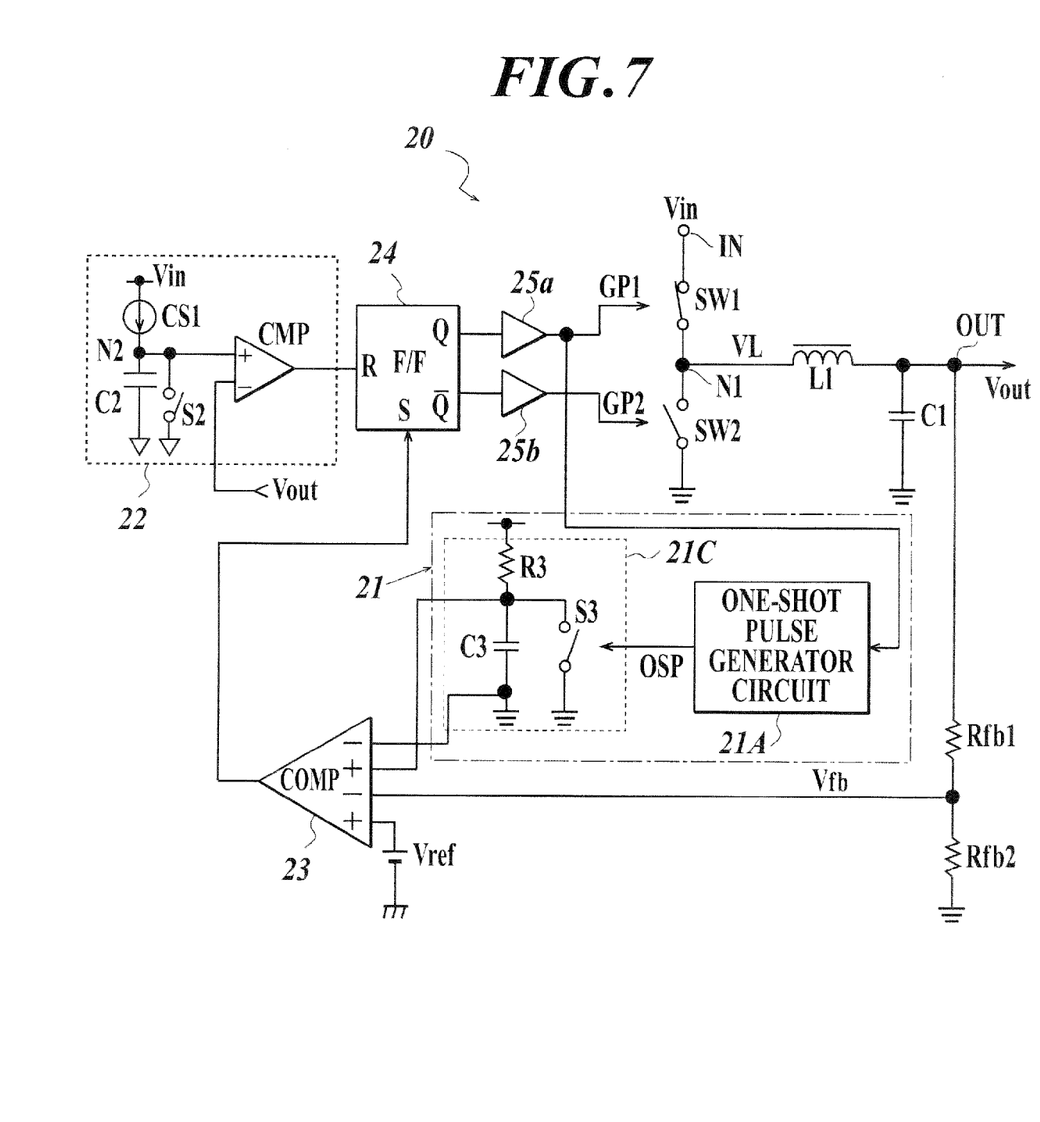
FIG. 7 is a circuit configuration chart illustrating a more specific application of the Dc-DC converter of the embodiment shown in FIG. 1 provided with the pseudo ripple generator circuit.

The switching control circuit 20 of FIG. 7 includes an adaptive on timer 22 which decides the time period of a timer which defines the on time of the driver switching element SW1 by feeding forward the input voltage Vin and the output voltage Vout. In the switching control circuit 20, the output of the timer 22 is input into a reset terminal of the RS flipflop 24 and the output of the comparator 23 is input into a set terminal, and the drive pulses GP1 and GP2 which turns the driver switching element SW1 and the rectifier switching element SW2 on or off are generated by supplying the output Q, /Q of the flipflop 24 to the driver circuits 25a, 25b. The adaptive on timer 22 and the RS flipflop 24 constitute the control logic circuit 26 of FIG. 1.

The adaptive on timer 22 of this embodiment includes a constant current source CS1, a capacitor C2 which is serially connected in series with the constant current source CS1, a discharger switch S2 and a comparator CMP. The discharger switch S2 is connected in parallel with the capacitor C2 and is turned on or off by the output /Q of the flipflop 24, for example. The comparator CMP in which the voltage of the connection node N2 of the constant current source CS1 and the capacitor C2 is input into the non-inverting input terminal and the output voltage Vout is input into the inverting input terminal. The constant current source CS1 is configured so as to feed the current Ic (∝Vin) which is proportional to the input voltage Vin.

Here, the operation of the DC-DC converter having the switching control circuit 20 configured as shown in FIG. 7 will be described. In order to facilitate understanding, descriptions are given for the case where the input voltage Vin is constant and the load varies and the case where the load is constant and the input voltage Vin varies. However, there are cases where the above variances in the load and the input voltage Vin occur at the same time in the reality. In such case, the operations described below are to proceed at the same time.

First, the case where the input voltage Vin is constant and the load changes to light condition from heavy condition will be considered. In this case, because the input voltage Vin is constant, the current Ic of the constant current source CS1 of the adaptive on timer 22 is constant. Therefore, the time required for the voltage of the node N2 inside the adaptive on timer 22 to reach the output voltage Vout does not change. When the voltage of the node N2 reached the output voltage Vout, the driver switching element SW1 is turned off, and the output voltage Vout decreases gradually thereafter because the load is light. Therefore, timing of the driver switching element SW1 to be turned on by the drive pulse GP1 changing to high level is to be delayed.

That is, when the load becomes light, cycle of the drive pulse GP1 becomes long. Further, when the cycle of the drive pulse GP1 becomes long, the current that feeds into the coil L1 through the driver switching element SW1 decreases due to the duty ratio becoming small. Thereafter, when the load is stabilized, the duty ratio and the frequency of the drive pulse GP1 maintain constant. In the ripple control system, the error amplifier used in the voltage control system and the current control system is not used. Therefore, the above described response can be obtained promptly.

On the other hand, in the case where the input voltage Vin is constant and the load changes to heavy condition from light condition, the output voltage Vout decreases relatively fast unlike in the above described case. Therefore, the timing of the driver switching element SW1 to be turned on by the drive pulse GP1 changing to high level comes earlier. That is, when the load becomes heavy, the cycle of the drive pulse GP1 becomes short. Further, when the cycle of the drive pulse GP1 becomes short, the current that feeds into the coil L1 through the driver switching element SW1 increases due to the duty ratio becoming large. Thereafter, when the load is stabilized, the frequency maintains constant.

Next, the operations of the adaptive on timer 22 in the case where the load is constant and the input voltage Vin is low and in the case where the load is constant and the input voltage Vin is high will be described.

When the input voltage Vin is low, current that feeds into the coil L1 from the input terminal IN during the time period when the driver switching element SW1 is turned on is small and the increasing rate of the output voltage is slow. However, when the input voltage Vin is low, the current Ic of the constant current source CS1 of the adaptive on timer 22 is small. Therefore, the time length needed for the voltage of the node N2 in the timer circuit to reach the output voltage Vout becomes longer and the timing of the output of the flipflop 24 lowering to low level delays. As a result, the time period when the driver switching element SE1 is turned on is to be long.

Moreover, when the input voltage Vin is high, more current feeds into the coil L1 from the input terminal IN and the increasing rate of the output voltage speeds up. However, because the current Ic of the constant current source CS1 of the adaptive on timer 22 increases, the time length needed for the voltage of the node N2 in the timer circuit to reach the output voltage Vout becomes short and the timing of the output of the flipflop 24 lowering to low level comes sooner. That is, the time period when the driver switching element SW1 is turned on is to be short.

Therefore, in the adaptive on timer 22, the product of current and time period is controlled to be approximately constant regardless of the level of the input voltage Vin. On the other hand, if the load is not changed, the timing of change in the output of the comparator 23, that is, the timing of turning the driver switching element SW1 on does not change. As a result, when the load is constant and the input voltage Vin changes, the duty ratio of the drive pulse of the driver switching element SW1 changes and the switching frequency maintain constant.

The invention accomplished by the present inventor is specifically described in the above referring to the embodiments, without limiting the present invention. For example, the wave form generator circuit 21C which constitutes the pseudo ripple generator circuit 21 of the second embodiment (FIG. 3) includes the capacitor C3 which is connected in series with the resistor R3 and the switch S3 which is connected in parallel with the capacitor C3, and generates a ramp wave form voltage (triangle wave in a broad sense). However, a second switch can be provided so as to connect in series with the resistor R3 of FIG. 3 and also a second resistor or a constant current source can be provided so as to connect in series with the resistor R3 to generate triangle wave in a narrow sense by turning the two switches on and off in a complementary manner.

Moreover, in the embodiment, the rectifier switching element SW2 which is formed of a MOS transistor is used as the rectifier element in low side connected between the start terminal and the grounding point of the coil L1. However, a DC-DC converter which uses a diode instead of the rectifier switching element SW2 can be used, and the present invention can also be applied in such case.

According to a first aspect of the preferred embodiments of the present invention, there is provided a switched-mode power supply including an inductor which is connected between a voltage input terminal to which a DC voltage is input and an output terminal to which a load is connected, a driver switching element which intermittently feeds a current to the inductor and a control circuit which generates a control pulse according to a feedback voltage from output side and controls on/off of the driver switching element, and the switched-mode power supply outputs a voltage having a level different from an input voltage, the control circuit includes a voltage comparison circuit which compares the feedback voltage to a predetermined voltage and a pseudo ripple generator circuit which generates a pseudo ripple voltage having a predetermined amplitude, and the control circuit injects a ripple component in a transmission path of the feedback voltage based on the pseudo ripple voltage generated by the pseudo ripple generator circuit.

According to the above, the present invention includes a pseudo ripple generator circuit which generates a pseudo ripple voltage having a predetermined amplitude and a ripple component is injected in a transmission path of a feedback voltage based on the pseudo ripple voltage generated by the pseudo ripple generator circuit. Therefore, the amplitude of the ripple voltage to be generated can be constant regardless of the duty ratio of the control pulse. Thereby, the ripple injection function can be installed in the control circuit (IC) without degrading line regulation.

Preferably, the pseudo ripple generator circuit includes a pulse generator circuit which generates a fixed pulse having a predetermined pulse width even when a duty ratio of the control pulse changes and having a cycle same as that of the control pulse, and a wave form generator circuit which generates a wave form voltage of a triangle wave according to the fixed pulse generated by the pulse generator circuit.

According to the above, a wave form voltage of triangle wave, having a predetermined amplitude, can be generated by the wave form generator circuit even when the duty ratio of the control pulse changes. Thereby, the ripple injection function can be installed in the control circuit (IC) without degrading line regulation.

Preferably, the wave form generator circuit includes a switching element in which on/off thereof is controlled by the fixed pulse generated by the pulse generator circuit, and a capacitor which repeats charging and discharging using a current from a constant current source according to an on/off operation of the switching element.

According to the above, the circuit for generating a wave form voltage of triangle wave having a predetermined amplitude even when the duty ratio of the control pulse changes can be realized in a circuit having a relatively simple configuration.

Preferably, the voltage comparison circuit is a comparator with four inputs having two differential input stages, and the feedback voltage and a predetermined voltage are input into one differential input stage and the wave form voltage and a reference voltage are input into the other differential input stage.

According to the above, there is no need to apply a ripple component directly to the feedback voltage. Therefore, when a protection circuit to protect from short circuit and overvoltage is provided in the control circuit, the protection circuit being connected to a terminal to which the feedback voltage is input, the voltage which is monitored by the protection circuit can be prevented from being influenced by the application of the ripple component. Therefore, malfunctioning can be prevented from occurring in the protection circuit.

Preferably, the wave form generator circuit includes an integrating circuit which integrates the fixed pulse generated by the pulse generator circuit. According to the above, the circuit for generating a wave form voltage of triangle wave having a predetermined amplitude even when the duty ratio of the control pulse changes can be realized in a circuit having a relatively simple configuration.

According to the present invention, there is an advantage that the ripple injection function can be installed in the control circuit (IC) in the switched-mode power supply based on the ripple control system without degrading line regulation and causing malfunction in the protection circuit.

What is claimed is:

1. A switched-mode power supply, comprising:
an inductor which is connected between a voltage input terminal to which a DC voltage is input and an output terminal to which a load is connected;
a driver switching element which intermittently feeds a current to the inductor; and
a control circuit which generates a control pulse according to a feedback voltage from an output side and which controls on/off of the driver switching element,
wherein the switched-mode power supply outputs a voltage having a level different from an input voltage,
wherein the control circuit comprises:
  a voltage comparison circuit which compares the feedback voltage to a predetermined voltage; and
  a pseudo ripple generator circuit which generates a pseudo ripple voltage having a predetermined amplitude,
wherein the pseudo ripple generator circuit comprises:
  a pulse generator circuit which generates a fixed pulse that has a predetermined pulse width even when a duty ratio of the control pulse changes and that has a cycle same as that of the control pulse; and
  a wave form generator circuit which generates a wave form voltage of a triangle wave according to the fixed pulse generated by the pulse generator circuit,
wherein the control circuit injects a ripple component in a transmission path of the feedback voltage based on the pseudo ripple voltage generated by the pseudo ripple generator circuit, and
wherein the voltage comparison circuit is a comparator with four inputs including a first differential input stage and a second differential input stage, wherein the feedback voltage and the predetermined voltage are input into the first differential input stage, and the wave form voltage and a reference voltage are input into the second differential input stage.

2. The switched-mode power supply according to claim 1, wherein the wave form generator circuit comprises:
a switching element whose on/off is controlled by the fixed pulse generated by the pulse generator circuit; and
a capacitor which repeats charging and discharging using a current from a constant current source according to an on/off operation of the switching element.

3. The switched-mode power supply according to claim 1, wherein the wave form generator circuit includes an integrating circuit which integrates the fixed pulse generated by the pulse generator circuit.

* * * * *